United States Patent
Hashimoto et al.

(10) Patent No.: US 6,396,030 B1
(45) Date of Patent: May 28, 2002

(54) ROBOT CONTROL DEVICE

(75) Inventors: Yoshiki Hashimoto, Kanagawa; Yoshiyuki Kubo; Takehisa Sera, both of Yamanashi, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/336,708

(22) Filed: Jun. 21, 1999

(30) Foreign Application Priority Data

Jun. 19, 1998 (JP) .......................................... 10-189872

(51) Int. Cl.$^7$ ................................................ H05B 1/02
(52) U.S. Cl. .................. 219/494; 219/490; 340/870.03; 710/1
(58) Field of Search ............................... 710/129, 1, 2, 710/20, 21, 131; 340/870.03; 399/8, 9, 11, 75, 77; 395/280, 710, 100, 131, 101, 102; 219/49, 490

(56) References Cited

U.S. PATENT DOCUMENTS

| | | | |
|---|---|---|---|
| 4,174,536 A | * 11/1979 | Misunas et al. | |
| 4,896,087 A | * 1/1990 | Onaga et al. | 395/84 |
| 4,908,556 A | * 3/1990 | Daggett et al. | 318/568.2 |
| 5,317,501 A | * 5/1994 | Hilpert | 364/132 |
| 5,625,353 A | * 4/1997 | Katagiri et al. | 340/870.03 |
| 5,692,197 A | * 11/1997 | Narad et al. | 713/323 |
| 5,729,573 A | * 3/1998 | Bailey et al. | 375/222 |
| 5,745,268 A | * 4/1998 | Eastvold et al. | 359/110 |
| 5,760,707 A | * 6/1998 | Katagiri | 340/870.11 |
| 5,875,312 A | * 2/1999 | Walsh et al. | 395/309 |
| 5,881,248 A | * 3/1999 | Mergard | 710/100 |
| 5,884,028 A | * 3/1999 | Kindell et al. | 709/234 |
| 5,995,771 A | * 11/1999 | Miyawaki | 399/8 |

FOREIGN PATENT DOCUMENTS

| | | |
|---|---|---|
| DE | 296 07 724 U | 7/1996 |
| DE | 196 21 384 | 11/1996 |
| JP | 61-161597 | 7/1986 |
| JP | 61-189304 | 11/1986 |
| JP | 64-51502 | 2/1989 |
| JP | 2-148302 | 6/1990 |
| JP | 2-201610 | 8/1990 |
| JP | 5-19827 | 1/1993 |
| JP | 5-265524 | 10/1993 |
| JP | 9-93274 | 4/1997 |
| WO | WO 96 31842 | 10/1996 |

OTHER PUBLICATIONS

Riverside Webster's II New College Dictionary 1995edition, p. 958 "Robot ".*

* cited by examiner

Primary Examiner—Mark Paschall
(74) Attorney, Agent, or Firm—Staas & Halsey LLP

(57) ABSTRACT

A control system includes a control section provided with a CPU (processor) for controlling a machine to be controlled, an operating section provided with an input/output card interface for enabling connection of an input/output card, and a communications circuit for performing communications between the control section and the operating section, the control section comprising a first serial communications interface connected to the CPU via a first communications control circuit, the operating section comprising a second serial communications interface connected to the input/output card interface via a second communications control circuit, and the communications circuit providing a connection between the first serial communications interface and the second serial communications interface.

5 Claims, 5 Drawing Sheets

ROBOT CONTROL DEVICE

BACKGROUND OF THE INVENTION

1. Field of the Invention

The present invention relates to a control system using a card-type input and output device in a control device for controlling a machine to be controlled, such as a robot control device, CNC control device, or the like.

2. Description of the Related Art

In a control device for controlling a machine which is to be controlled, such as a robot control device, CNC control device, or the like, there arise cases where data inside the control device is output externally, and cases where data and programs are input to the control device from a source that is external to the control device. Card-type devices called input/output cards are known as one means for carrying out this input and output of data and programs.

Furthermore, a PCMCIA, or the like, is known as an interface for connecting input/output cards of this kind.

FIG. 5 is a diagram for illustrating a conventional composition for connecting input/output cards to a control device. The composition of the control device 100 shown in FIG. 5 is a general composition used commonly in a variety of control devices, and only the principal constituent elements thereof are depicted. A CPU 110, ROM 114, RAM 115, and axis control circuit 116 for performing calculational and control operations are connected to a CPU bus 111. The CPU 110 performs control operations on the basis of programs stored in the ROM 114 and data stored in the RAM 115, and it controls the machine to be controlled by driving a servo amp 117 via the axis control circuit 116.

An input/output card can be connected to a control device 100 of this kind by connecting a input/output card interface 112 directly to the CPU bus 111 via a parallel bus 118, and then connecting the input/output card 4 to this input/output card interface 112.

Depending on the ease of operation and the set-up conditions of the device and machine, etc., cases may arise where operation of the input/output card 4 has to be carried out in a remove location from the control device 100.

One conceivable composition for providing a distance between the control device 100 and the input/output card 4 is to extending the length of the aforementioned parallel bus 118. However, generally, a parallel bus requires a large number of signal lines, since it uses a plurality of data lines and control lines, and hence this leads to problems in terms of increasing costs. In order to restrict cost rises in the device, it is not possible to extend the lines in the parallel bus beyond a certain length, and hence remote installation of the input/output card 4 is not practical by extension of the parallel bus.

Therefore, a composition may be conceived wherein an operating device for connecting input/output cards is provided independently from the control device, and the control device and operating device are connected together by means of a serial communications circuit. FIG. 6 is a compositional diagram for illustrating a connection between a control device and an operational device using a serial communications circuit. The compositions of the control device 100 and the operating device 200 shown in FIG. 6 are general compositions common to a variety of control devices and operating devices, and only the principal constituent elements thereof are depicted here.

In the control device 100 in FIG. 6, a CPU 110, ROM 114, RAM 115 and axis control circuit 116 are connected to a CPU bus 111, and a communications interface 114 are also connected thereto via a parallel bus 118. Moreover, in the operating device 200, a CPU 210, ROM 214, RAM 215 and an I/O interface 216 connecting key 201, etc. is connected to the CPU bus 211, and an input/output card interface 224 is also connected thereto via a parallel bus 218.

The control device 100 and operating device 200 are connected to each other by means of the communications interfaces 113,213, and a serial communications circuit 300 connecting these interfaces. An input/output card 4 connected to the input/output card interface 224 is controlled by CPU 210 in the operating device 200, and signals can be exchanged with the control device 100 via the communications interfaces 113,213, and the serial communications circuit 300.

Therefore, in a composition where the input/output card interface is connected to the parallel bus of the control device, when an input/output card is connected to the control device, operation of the input/output card is restricted to the vicinity of the host CPU of the control device, due to limitations on the length of the lines in the parallel bus, and hence it is difficult to situate an operating device for operating an I/O card in a remote location from the control device.

Moreover, in a composition where the control device and input/output card are connected by means of a serial communications circuit in order to situate this operating device at a remote location, it becomes necessary to provide a separate CPU for controlling communications on the input/output card side, thereby leading to cost increases.

OBJECTS AND SUMMARY OF THE INVENTION

It is an object of the present invention to overcome the problems associated with conventional control systems, by providing a control system which enables connecting of input/output cards using an input/output card interface, without using a CPU for controlling communications, and also by providing a control system which is capable of handling input/output cards connected at a remote location from the control device in a similar manner to input/output cards connected to the control device.

By extending the length of the parallel bus in the control device on the input/output card side, by means of serial communications, the control system according to the present invention enables an input/output card connected at a remote location from the control device to be accessed in a similar manner to a device connected to the parallel bus of the control device without using a CPU for controlling communications.

One mode of a control system according to the present invention is a control system comprising a control selection provided with a CPU (processor) for controlling a machine to be controlled, an operating section provided with an input/output card interface for enabling connection of an input/output card, and a communications circuit for conducting communications between the control section and the operating section, wherein the control section comprises a first serial communications interface for connecting to the CPU via a first communications control circuit, the operating section comprises a second serial communications interface connected to the input/output card interface via a second communications control circuit, and the communications circuit is constituted by a serial communications circuit connecting a first serial communications interface with the second serial communications interface.

Here, the machine to be controlled is a machine controlled by means of control signals, such as a robot, machine tools, or the like, whilst the control device is a robot control device, CNC control device, or the like, which implements control over the machine to be controlled.

The control section according to the present invention is a constituent element corresponding to the control device described above, and it comprises a CPU (processor) for controlling the machine to be controlled, and a ROM, RAM, axis control circuit, and the like, used together with the CPU. The CPU implements control operations on the basis of programs and the data stored in the ROM and RAM, and it controls the machine to be controlled by driving a servo motor via the axis control circuit. Moreover, the control circuit also comprises a first communications control circuit and a first serial communications interface.

The operating section according to the present invention comprises an input/output card interface which enables input/output cards to be connected, and hence it serves to provide input/output cards connection and enables access between the control section and the input/output card. For the input/output card interface, it is possible to use a card-type input/output interface such as a PCMCIA device, for example. The operating section also comprises a second communications control circuit and a second serial communications interface. It is possible to connect other devices besides input/output cards to the operating section.

In the communications circuit according to the present invention, it is also possible to constitute bi-directional communications using two-way communication by means of separate circuits for the outward and inward channels, or by means of the same circuit for the outward and inward channels. Furthermore, it is possible to apply this composition to either a full-duplex transmission system which transmits bi-directional signals by multiplexing, or a half-duplex transmission system which transmits in a single direction alternately by time division.

Moreover, with regard to the processing of data in the control section and operating section, it can also be applied either to a transmission mode for conducting serial transmission on a single line, or a transmission mode for conducting parallel transmission by a plurality of lines.

This communications circuit is controlled by the first and second communications control circuits. These communications control circuits are constituted by hardware, using an LSIs, and the like, and communications can be controlled by using the CPU on the control section side and dispensing with installation of a CPU on the operating section side.

In one embodiment of the control system according to the present invention, an input/output card is connected to an input/output card interface on the operating section side. Furthermore, a serial communications circuit is used as the communications circuit. If input/output card access is performed between the control section and the operating section, then at the operating section side, in addition to accessing the input/output card connected to the input/output card interface under the control implemented by the second communications control circuit, data and control signals are exchanged with the communications circuit via the second serial communications interface, whilst at the control section side, in addition to processing CPU access requests under the control of the first communications control circuit, data and control signals are exchanged with the communications circuit via the first serial communications interface. The first and second communications control circuits convert the parallel bus signals handled by the control section and the operating section into serial signals which they supply to the communications circuit, and furthermore, they convert serial signals received via the communications circuit into parallel bus signals.

Consequently, a composition is achieved wherein the operating section is connected to the bus on the control section side via the communications circuit, and hence the parallel bus on the control section side can be extended to the operating section side and an input/output card can be connected to the end of the parallel bus, thereby enabling the CPU in the control section to access the input/output card in a similar manner to devices connected to the parallel bus.

According, a remotely located input/output card can be accessed without using a CPU for controlling communications.

Moreover, the input/output card according to the present invention is a card-type device for conducting input and output of data and programs, for example, a card having a communications connection function, such as modem card, or a card having a memory function, such as a memory card, ATA flash disk card, or the like.

When a modem card is used as the input/output card, then data and programs can be input from and output to a further device in a remote location, by means of a telephone line, or the like, thereby enabling, for example, remote diagnosis of the control device by connecting a diagnostic device.

Moreover, in the operating section, a composition may be also be adopted wherein the second communications control circuit, in addition to being connected to the input/output card interface, is also connected to an input/output connection device for connecting input means, such as buttons, switches, etc., and output means, such as a display, printer, etc., or to an external device interface for connecting external devices, such as external memory devices, or the like, the second communications control circuit being connected to the end of the parallel bus of the control section similarly to an input/output card, thereby enabling the CPU in the control section to access same in a similar manner to devices connected to the parallel bus.

Moreover, the control section according to the present invention may be a control section comprising a robot control device or a numerical control device, and it may be applied to controlling robots or machine tools.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Below, an embodiment of the present invention is described in detail with reference to the drawings.

Figure 1:
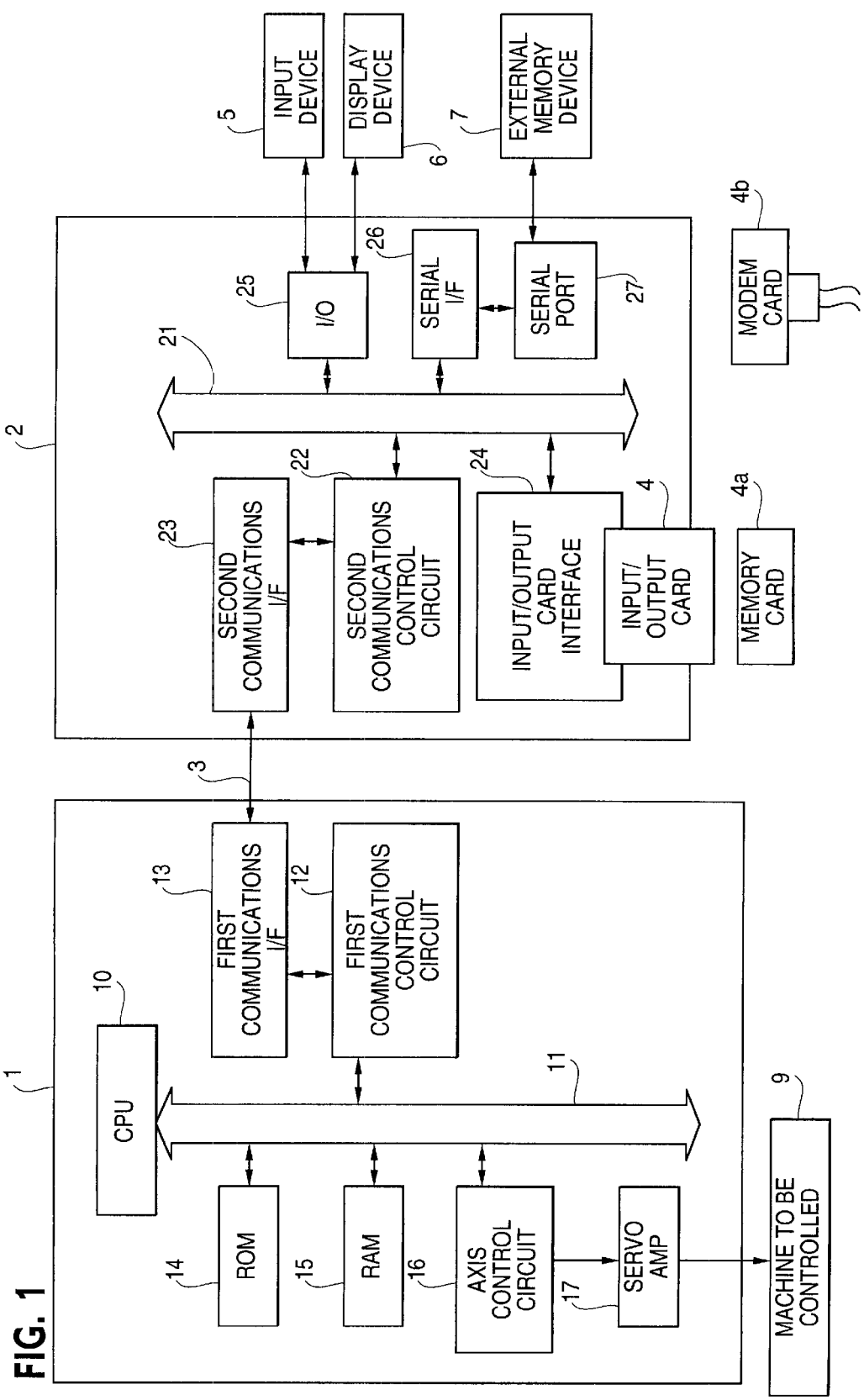
FIG. 1 is a block diagram showing one composition of a control system according to the present invention.

The composition of this embodiment of the invention is described using the block diagram in FIG. 1 illustrating a composition of a control system according to the present invention.

The control system according to the present invention comprises a control section 1, an operating section 2 and a communications circuit 3, and the operating section 2 can be located remotely from the control section 1. The control section 1 controls driving of the machine to be controlled 9.

In the control section 1, CPU (processor) 10 is a microprocessor which controls the whole section 1, and it reads out system programs stored in a ROM 14, via a CPU bus 11, and controls the control section 1 on the basis of these system programs. RAM 15 stores temporary calculation data, display data, and various data input by an operator via a CRT/MDI unit (not illustrated), or the like.

RAM 15 can be constituted by a COMS memory, and it can also be backed up using a battery (not illustrated) to form a non-volatile memory which retains stored information even when the power source to the control unit 1 is switched off. The RAM 15 stores processing programs read in via an interface (not illustrated), processing programs input via CRT/MDI unit (not illustrated), and the like. Furthermore, various system programs for implementing editing mode processing required for creating or editing processing programs, and replay mode processing for conducting automatic operation, are stored previously in the RAM 15.

A first communications control circuit 12 is connected to the CPU bus 11 via a parallel bus, and a first serial communications interface 13 is connected to the first communications control circuit 12. The first communications control circuit 12 converts parallel bus signals to serial signals, and converts serial signals received from the operating section 2 to parallel bus signals. The first serial communications interface 13 converts between the electrical signals used inside the device and the signal mode used for communications. For this signal mode, electrical communications, optical communications, or the like, may be used.

Moreover, the control section 1 may also comprise a PMC (programmable machine controller) (not illustrated), whereby, for example, it is able to control auxiliary devices on the processing machine side, such as actuators, for instance, robot hands for changing tools, or the like. The PMC, for example, converts the M functions, S functions and T functions designated by the machining program to signals required by the auxiliary devices, by means of a sequencing program, and outputs these signals to the auxiliary devices via the I/O unit. The auxiliary devices, such as actuators, are operated by means of the output signals. Furthermore, the PMC also receives signals from the limit switches on the machine tool main body and auxiliary devices, and various switches of the operating panel provided on the machine tool main body, and after necessary processing, it passes these signals to the CPU 10.

Image signals, such as the current position of each axis of the machine tool connected to the control section 1, alarms, parameters, and image data, etc., are supplied to a CRT/MDI unit (not illustrated) and are displayed thereon. The CRT/MDI unit is a manual data input device provided with a display and a keyboard, or the like. Data from the keyboard is sent to the CPU 10 through an interface (not illustrated) connected to the bus 11. A manual pulse generator is connected to another interface (not illustrated) also connected to the bus 11. And this interface receives pulses from the manual pulse generator. The manual pulse generator is installed on the operating panel of the machine tool main body, and it is used to position the moving part of the machine tool accurately by controlling the various axes thereof by means of distributed pulses based on manual operation.

An axis control circuit 16 receives movement commands for each axis from the CPU 10 and it outputs these axis commands to the servo amp 17. Upon receiving these commands, the servo amp 17 drives servo motors (not illustrated) for each axis of the machine to be controlled 9. A pulse coder (not illustrated) for detecting position is installed in the servo motors for each axis, and the positional signals from the pulse coders are fed back in the from of pulse sequences. Depending on the situation, a linear scale can be used for positional detection. Furthermore, a velocity signal can be generated by F/V (frequency/voltage) conversion of the pulse sequences.

The operating section 2 comprises an input/output card interface 24 for connecting an input/output card 4, and a second communications control circuit 22 and a second serial communications interface 23 for providing a connection with the control section 1 via the communications circuit 3.

The second communications control circuit 22 and the input/output card interface 24 are connected to a parallel bus 21 inside the operating section 2. The second serial communications interface 23 is connected to the second communications control circuit 22. The second communications control circuit 22 converts serial signals received from the control section 1 to a signal for the parallel bus 21, and accesses the input/output card 4, and when this access is a read operation, it converts the data output from the input/output card 4 to the parallel bus 21 into a serial signal and transmits this to the control section 1. The second serial communications interface 23 performs conversion between the electrical signals used inside the device and the signal mode used in communications.

Consequently, the parallel signal on the CPU bus 11 on the control section 1 side is converted to a serial signal by the first communications control circuit 12, and the converted serial signal is then transferred, via the first serial communications interface 13, the communications circuit 3, and the second serial communications interface 23, to the operating section 2, where it is converted to a parallel signal by the second communications control circuit 22, and transmitted via the parallel bus 21 to the input/output card 4 connected to the input/output card interface 24.

Furthermore, on the operating section 2 side, parallel signal data is output to the parallel bus 21 from the input/output card 4, via the input/output card interface 24. The data on the parallel bus 21 is converted to a serial signal by the second communications control circuit 22, and the converted serial signal is then transmitted to the control section 1 side, via the second serial communications interface 23, the communications circuit 3 and the first serial communications interface 13. The serial signal is converted to a parallel signal by the first communications control circuit 12 and then transmitted via the CPU bus 11 to the CPU 10.

Moreover, in addition to the foregoing constituent elements, the operating section 2 also comprises an interface for connecting external devices to the operating section 2, thereby allowing connection of external devices such as input/output means, external memory devices, and the like. Machining programs, or the like, can be read in from input/output means or an external memory device, etc., and machining programs edited inside the control section 1 can be output to the input/output means or external memory device. An input device 6 and display device 6 are connected via I/O 25 to a bus 21, and an external memory device 7 is connected via a serial interface 26 and a serial port 27 to the bus 21.

Figure 2:
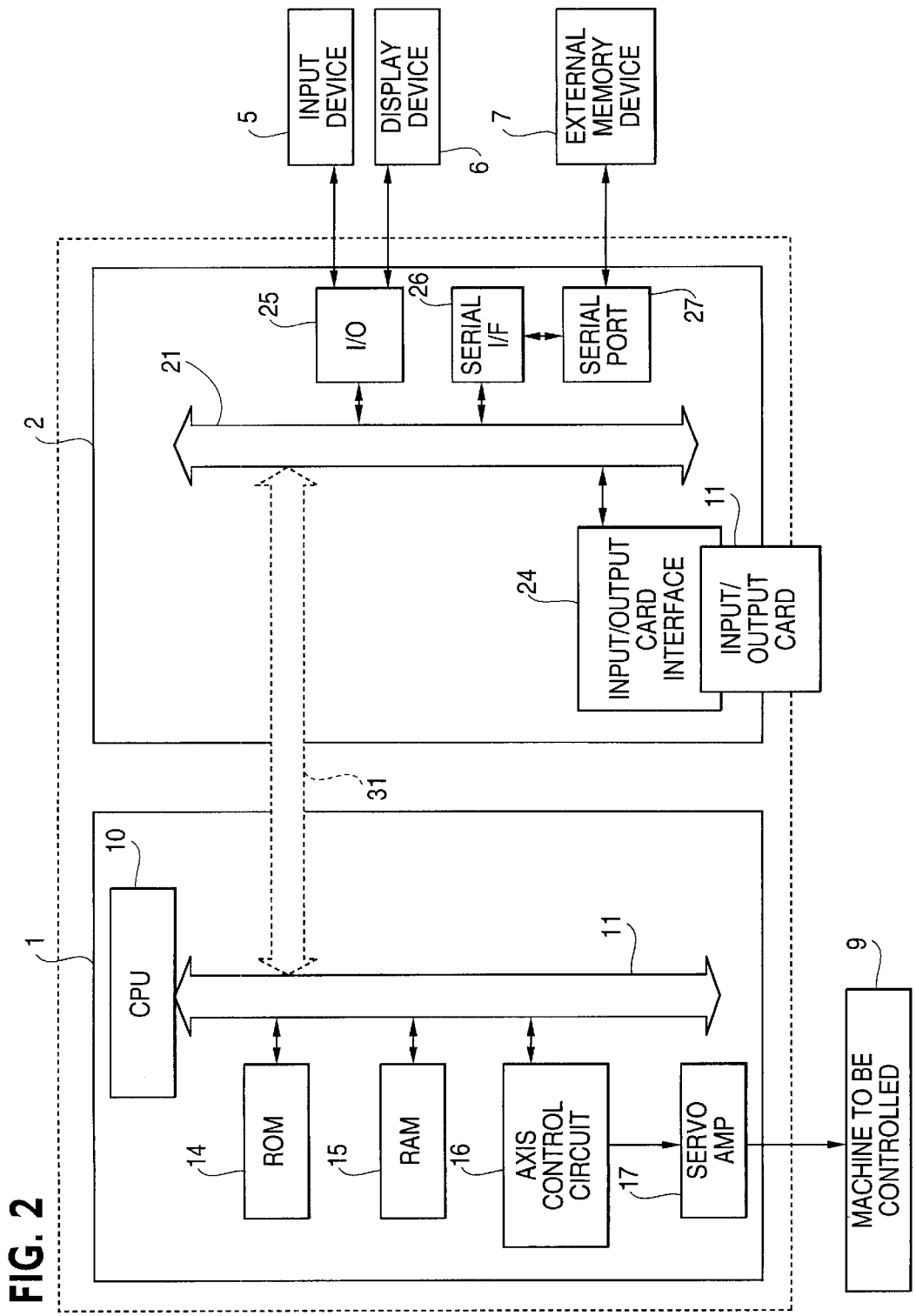
FIG. 2 is an approximately block diagram for describing the functions of the control system according to the present invention.

FIG. 2 is an approximate block diagram for describing the functions of the control system according to the present invention. According to FIG. 2, in the control system according to the present invention, the control section 1 and operating section 2 can be regarded as forming a bus-connected composition by means of the bus structure 31 indicated by the broken line in the diagram.

This bus structure 31 is constituted by the first communications control circuit 12, the first serial communications interface 13, the communications circuit 3, the second serial communications interface 23 and the second communications control circuit 22 illustrated in FIG. 1. Since the CPU bus 11 in the first communications control circuit 12 and the bus 21 in the second communications control circuit 22 use parallel signals, the two ends of the bus section 31 are connected to the CPU bus 11 and bus 21. Thereby, the CPU 10 and input/output card 4 are bus-connected by means of the CPU bus 11, the bus sections 31 and the bus 21.

Consequently, the CPU 10 is able to access the input/output card 4 connected to the operating section 2 side in a similar manner to devices connected to the control section 1 side.

For the input output card 4, a memory card 4a or a modem card 4b may be used.

Next, the operation of the control system according to the present invention is described, using as an example an operation where the input/output card on the operating section side is accessed from the control section side.

Figure 3:
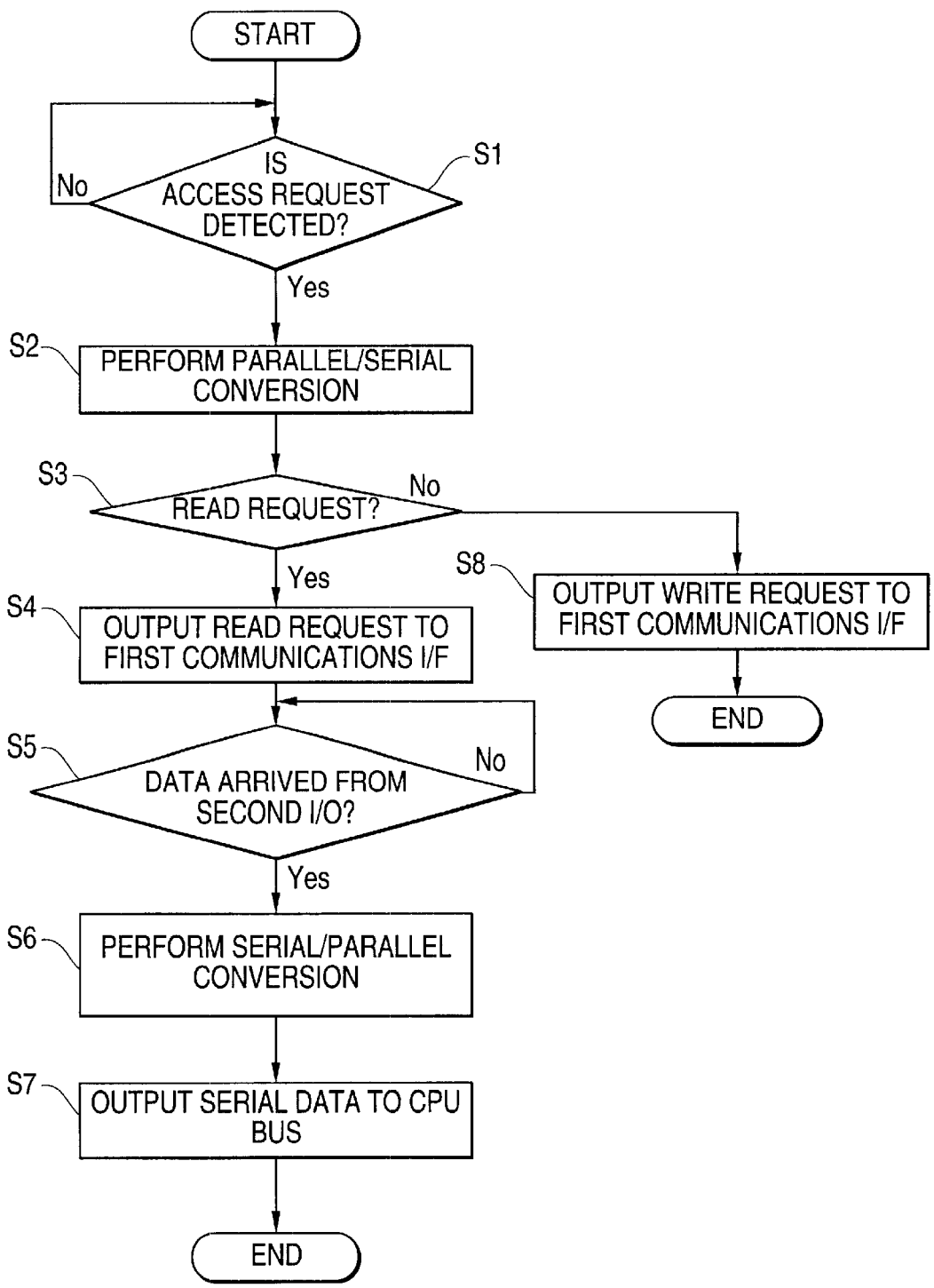
FIG. 3 is a flowchart for describing the operation of a first communications control circuit on the control section side in the control system according to the present invention.
Figure 4:
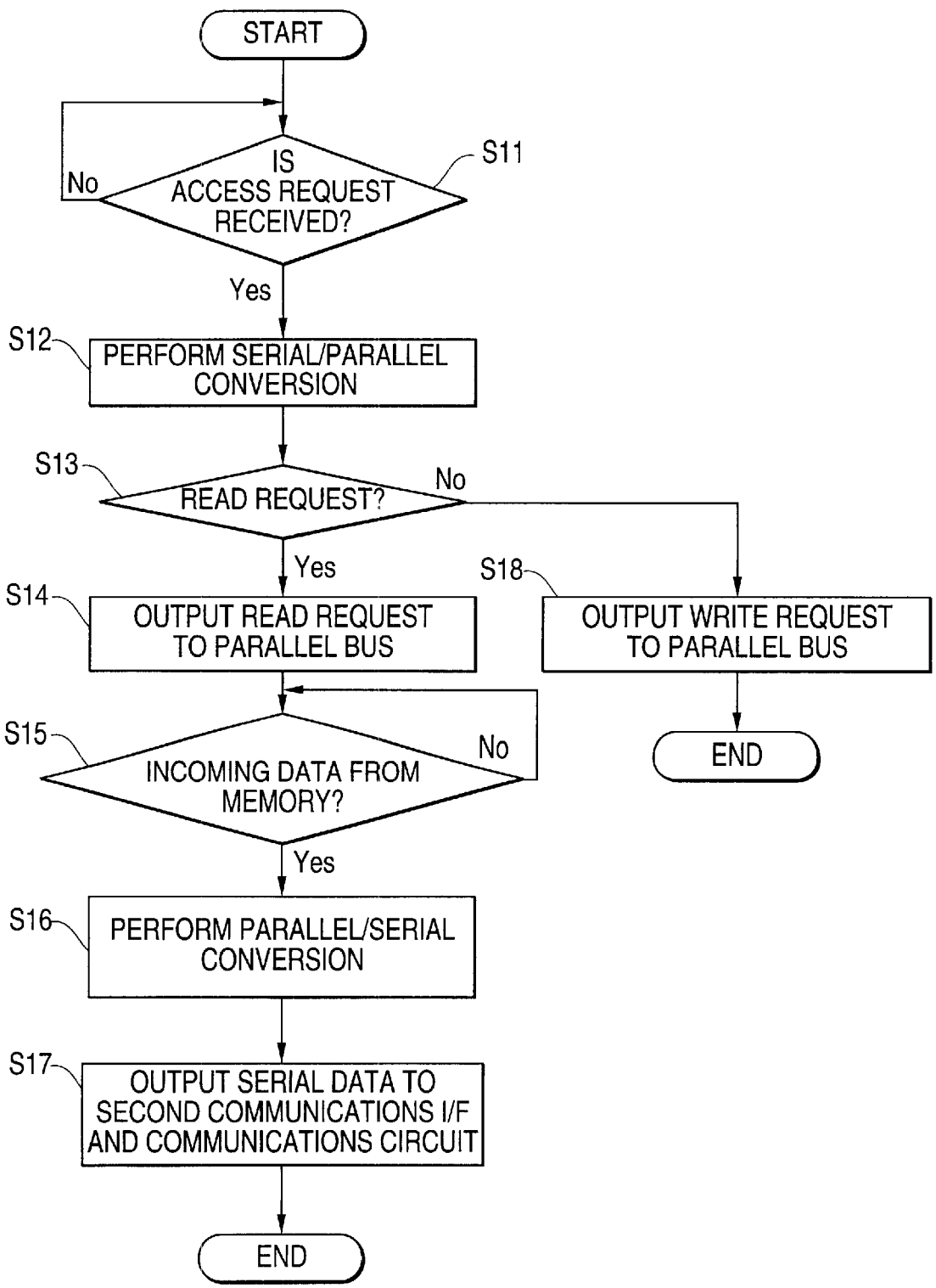
FIG. 4 is a flowchart for describing the operation of a second communications control circuit on the operating section side in the control system according to the present invention.
Figure 5:
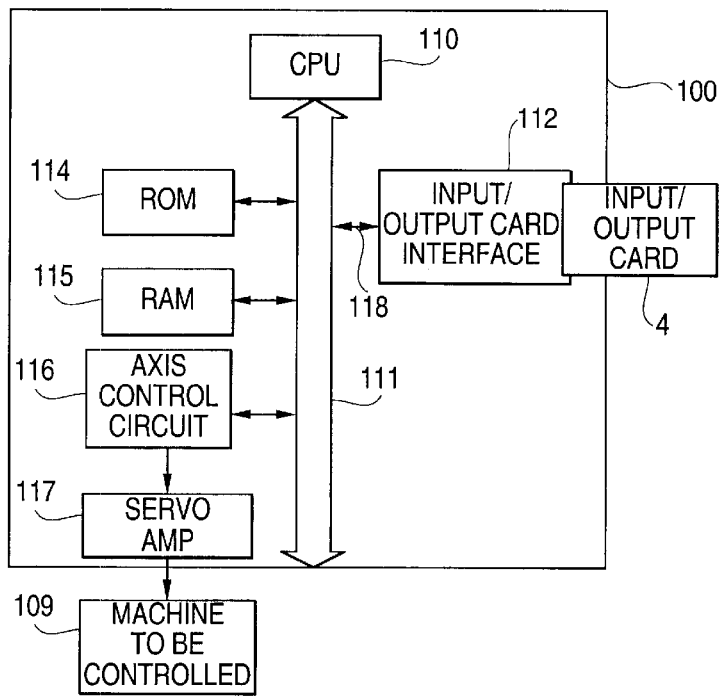
FIG. 5 is a diagram for describing a conventional composition for connecting an input/output card to a control device.
Figure 6:
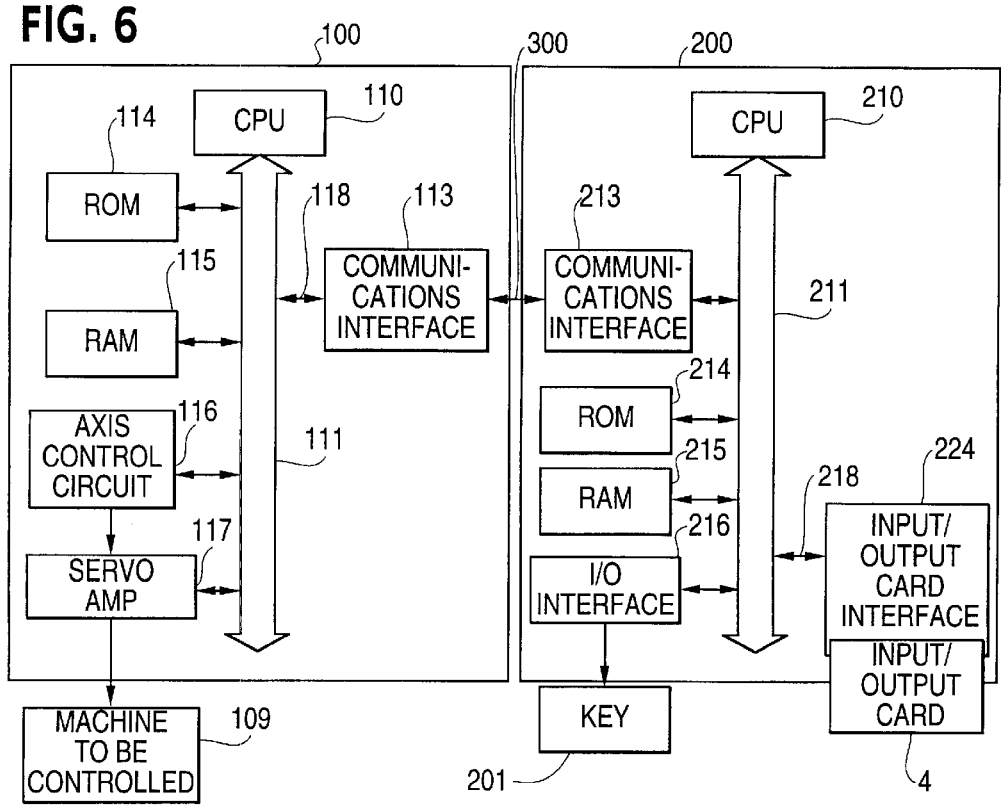
FIG. 6 is a compositional diagram for describing connection between a control device and an operating device using a serial communications circuit.

FIG. 3 is a flowchart of the operation of the first communications control circuit 12 on the control section side, and FIG. 4 is a flowchart of the operation of the second communications control circuit 22 on the operating section side.

When the first communications control circuit 12 detects an access request from the CPU bus 11 to the bus 21 in the operating section 2 (step S1), it converts the access request signal on the parallel bus to a serial signal (step S2).

If the access request is a read request (step S3), then the control signal (read request) converted to a serial signal is output, with an address signal, to the first communications interface 13. The first communications interface 13 transmits the serial signal (control signal (read request), address signal) to the communications circuit 3 (step S4).

The first communications control circuit 12 waits for incoming data (serial signal) from the communications circuit 3 (step S5), and converts the incoming serial signal data to a parallel signal (step S6). The converted parallel signal is then output to the CPU bus 11 (step S7).

If the access request is a write request (step S3), then a control signal (write request) converted to a serial signal is output, with a data signal and an address signal, to the first communications interface 13 (step S8).

When the second communications control circuit 22 receives an access request via the communications circuit 3 and the second communications interface 23 (step S11), it converts the serial signal of the access request to a parallel signal (step S12).

If the access request is a read request (step S13), then the control signal (read request) converted to a serial signal is output, with an address signal, to the bus 21. Upon receiving this read request, the memory connected to the bus 21 reads out data corresponding to the address and transmits this data to the bus 21 (step S14).

The second communications control circuit 22 waits for data (parallel signal) transmitted to the bus 21, and when data is transmitted to the bus 21, it converts the parallel signal data to a serial signal (step S16). The converted serial signal is then output to the second communications interface 23 (step S17).

Moreover, if the access request is a write request (step S13), the control signal (write request), data signal and address signal converted parallel signals are output to the bus 21 and written to the memory (step S18).

As illustrated in the flowchart in FIG. 3, the control section 1 is able to access the input/output card 4 in a similar manner to accessing a device connected to the CPU bus, and the CPU 10 is able to perform operations without distinguishing whether the input/output card 4 is a device connected to the operating section side or a device connected to the control section side. Moreover, the communications circuit can be constituted by means of a serial communications circuit, and even if the control section and the operating section are located remotely from each other, it is still possible to access an input/output card located on the operating section side. The foregoing examples related to a case where the section to be controlled is a machine tool, but the same applies in cases where the section to be controlled is a robot. As described above, according to the control system of the present invention, it is possible to connect an input/output card using an input/output card interface, without employing a CPU for controlling communications. Furthermore, it is also possible to handle an input/output card connected at a remote location from the control device in a similar manner to a device connected to the control device.

What is claimed is:

1. A control system comprising:
a control section provided with a microprocessor;
an axis control circuit connected to the microprocessor, the axis control circuit controlling a robot;
an operating section provided with an input/output card interface enabling connection of an input/output card containing a device to control the robot; and
a communication circuit for performing communications between said control section and said operating section,
wherein said control section comprises a first serial communications interface connected to said microprocessor via a first communications control circuit;
said operating section comprises a second serial communications interface connected to said input/output card interface via a second communications control circuit;
said communications circuit is a serial communications circuit for connecting the first serial communications interface with the second serial communications interface; and
said microprocessor directly accesses the input/output card through the first serial communication interface, the second serial communications interface, and the serial communication circuit, to transmit data to/from the input/output card; and said microprocessor access is achieved by the first communication control circuit transmitting the addresses for a read/write request to said serial communication circuit, through said first serial communication interface, based on the access request from said microprocessor.

2. The control system according to claim 1, wherein said input/output card is a card having a communications connection function or a card having a memory function.

3. The control system according to claim 1, wherein said second communications control circuit is connected to an input/output connecting interface connected to an input/output device, or to an external machine interface connected to an external machine.

4. The control system according to claim 1, wherein said control section is a control section provided in a robot control device or a numerical control device.

5. A robot control system comprising:

an axis control circuit connected to a robot the axis control circuit comprising a microprocessor;

a parallel to serial converter connected to the axis control circuit;

a serial cable connected to the parallel to serial converter;

a serial to parallel converter connected to the serial cable; and a robot controlling device connected to the serial to parallel converter and directly accessible by the microprocessor which can read or write data directly to the robot controlling device.

* * * * *

UNITED STATES PATENT AND TRADEMARK OFFICE
CERTIFICATE OF CORRECTION

PATENT NO.    : 6,396,030 B1
DATED         : May 28, 2002
INVENTOR(S)   : Yoshiki Hashimoto et al.

It is certified that error appears in the above-identified patent and that said Letters Patent is hereby corrected as shown below:

<u>Title page,</u>
Item [54], change the title to -- ROBOT INTERFACE CONTROL DEVICE HAVING SERIAL COMMUNICATION --.

<u>Column 2,</u>
Line 1, change "114 are" to -- 113 is --.

Signed and Sealed this

Eighteenth Day of March, 2003

JAMES E. ROGAN
*Director of the United States Patent and Trademark Office*